United States Patent
Okita et al.

[11] Patent Number: 5,552,573
[45] Date of Patent: Sep. 3, 1996

[54] RESISTANCE WELDING PROCESS FOR ALUMINUM AND ALUMINUM ALLOY MATERIALS

[75] Inventors: Tomiharu Okita; Mikihiro Sugimori; Masanori Ozaki; Takao Orimo, all of Tokyo, Japan

[73] Assignee: The Furukawa Electric Co., Ltd., Japan

[21] Appl. No.: 167,396

[22] Filed: Dec. 8, 1993

[51] Int. Cl.$^6$ .......................... B23K 11/11; B23K 11/16; B23K 11/30

[52] U.S. Cl. .................. 219/118; 219/86.1; 219/91.2; 219/92

[58] Field of Search ................ 219/78.01, 86.1, 219/91.2, 117.1, 118, 119, 120, 81, 92

[56] References Cited

U.S. PATENT DOCUMENTS

| | | | |
|---|---|---|---|
| 1,094,141 | 4/1914 | Gnüchtel | 219/118 |
| 4,861,961 | 8/1989 | Huys | 219/119 |

FOREIGN PATENT DOCUMENTS

| | | | |
|---|---|---|---|
| 64-83382 | 3/1989 | Japan | 219/91.2 |
| 4-356371 | 12/1992 | Japan | 219/118 |
| 5-228642 | 9/1993 | Japan | 219/118 |
| 5-200563 | 10/1993 | Japan | 219/118 |
| 5-318136 | 12/1993 | Japan | 219/118 |
| 331 | 1/1913 | United Kingdom | 219/118 |

*Primary Examiner*—Teresa J. Walberg
*Assistant Examiner*—J. Pelham
*Attorney, Agent, or Firm*—Lorusso & Loud

[57] ABSTRACT

A resistance welding process for aluminum and aluminum alloy materials for enabling the remarkable improvement of the electrode life comprises the steps of preparing an insert material having the overall thickness of 0.02 to 1 mm including a sheet-like core material consisting of iron, steel, copper or copper alloy and coated layers each having the thickness of 1 to 100 μm, consisting of any one of Ni, Ni alloy, Ti, Ti alloy, Nb, Nb alloy, Mo, Mo alloy, W, W alloy, Cr, Cr alloy, Co and Co alloy and formed on both surfaces of the core material, or an insert material consisting of Ti foil or Ni foil; interposing the insert material between each of upper and under electrodes and each portion of overlapped materials to be welded consisting of aluminum or aluminum alloy; pressurizing the materials to be welded by the upper and under electrodes to join the materials to be welded together. The coated layers on both surfaces of the core material may consist of the same metal or different metals from each other. When the core material of the insert material consists of iron or steel, the insert material having the coated layer consisting of Ti and formed on one surface is interposed between each electrode and each portion of the materials to be welded in such a state that the coated layer faces each material to be welded, and the materials to be welded are pressurized and jointed together.

7 Claims, 5 Drawing Sheets

RESISTANCE WELDING PROCESS FOR ALUMINUM AND ALUMINUM ALLOY MATERIALS

BACKGROUND OF THE INVENTION

1. Field of the Invention

This invention generally relates to a resistance welding process for aluminum and aluminum alloy materials, and more particularly, to a resistance welding process which enables the remarkable improvement of the electrode life in case of joining aluminum or aluminum alloy materials together by means of resistance spot welding.

2. Description of the Prior Art

A resistance spot welding process includes the steps of pressurizing an overlap portion of overlapped materials to be welded by upper and lower electrodes to apply current to the materials, then exothermally fusing a contact portion of the materials in part due to the electrical resistance of the materials to form a nugget in the contact portion, and joining the materials together.

The resistance spot welding process as described above has been often used as a joining process for rolled steel sheets in the assembly line for mass production of automobiles or the like following reasons That is, the thermal influence on the materials to be welded is small to result in small deformation of a product, the time required for welding is short to be adaptable to the mass production, and if the welding conditions are determined once, the stable and uniform joint strength can be obtained easily regardless of the skill of a welding worker or even by use of a robot.

The resistance spot welding process has the characteristics described above. However, in case of joining aluminum or aluminum alloy materials together by means of resistance spot welding, this process has such a problem as the electrode life is extremely short, in comparison with that in case of joining rolled steel sheets together by means of resistance welding.

The electrode life herein is defined as the number of times of continuous spot welding in continuously carrying out spot welding with predetermined efficiency by using electrodes which are preliminarily subjected to dressing (which means that the tip end of the electrode is cut to a predetermined shape or polished to a predetermined surface roughness) once prior to the start of welding. In general, the electrode life is evaluated on the basis of the number of times of continuous spot welding up to not more than a regular value in nugget diameter or shear strength of welded spot, or the number of times of continuous spot welding up to the occurrence of such a phenomenon as the electrode material is deposited and permanently affixed to the welded materials.

When the electrode life is evaluated on the basis of the standards as described above, the electrode life generally exceeds 10000 spot welds in the case of joining rolled steel sheets together by means of resistance spot welding, whereas the electrode life comes up to several hundred spot welds at most, in the case of joining aluminum or aluminum alloys together by means of resistance spot welding.

As the material of the electrode, use is normally made of chrome-copper alloy and chrome-zirconium-copper alloy which have satisfactory thermal conduction and high conductivity (refer to the first or second group of "Copper Electrode Materials for Resistance Welding" shown in JIS Z 3234-1977 edition). However, in case of using aluminum or aluminum alloy as the materials to be welded, it has been considered that the electrode life is shortened for the following reasons.

Namely, one of the reasons is the fact that the aluminum and aluminum alloy have far low melting points and far high thermal and electrical conductivities, in comparison with rolled steel sheet, and therefore, the aluminum and aluminum alloy have to be welded at high current and high pressure for a short period of time, in comparison with the conditions of joining the rolled steel sheets together by means of resistance welding.

Another reason is as follows: the consumption of the electrode becomes remarkable since aluminum and aluminum alloy have their surfaces covered with an insulating oxide film having a high melting point, the calorific values between the electrodes and the materials in the resistance spot welding become excessive due to the presence of the oxide film described above when bringing the electrodes into contact with the materials to apply current to the materials, and ultimately the electrodes are heated up in excess to fuse or alloy the electrodes and the materials.

For instance, in order to improve the fuel efficiency for automobiles, as material for auto body sheets, aluminum alloys have been used instead of rolled steel sheets. However, as described above, in the case of joining aluminum or aluminum alloy materials together by means of resistance spot welding, the electrode life is extremely short, in comparison with the case of joining rolled steel sheets together by means of resistance welding. Thus, it has been necessary to frequently dress the electrodes, and the resultant productivity thereby suffers. In this respect, there is a hindrance to the use of aluminum or aluminum alloy sheets as a material for automobiles.

In order to improve the electrode life in case of joining aluminum or aluminum alloy materials together by means of resistance spot welding, there has been proposed a process of welding by interposing an insert material consisting of a foil of a metal other than the aluminum or aluminum alloy between the material to be welded and each of the upper and under electrodes.

For instance, as shown in FIG. 7, Japanese Patent laid-open No. 61-159288 has disclosed a process for joining aluminum or aluminum alloys together by means of resistance spot welding by interposing insert materials 14 and 15 (e.g., Cu or Ag) having electrical conductivity higher than those of upper and under electrodes 1 and 2, respectively, between the upper and under electrodes 1 and 2 and materials to be welded 11 and 12. According to this process, even though the aluminum or aluminum alloys are welded under considerable heat input in excess, the aluminum alloys themselves are welded together without generating any surface crack and without bringing the weld penetration of the material up to the surface. This welding process can improve the electrode life to a certain degree as well.

However, when the insert materials, each consisting of Cu or Ag, are used and the materials to be welded are pressed by the electrodes at about 200° C., the insert materials and aluminum are easily subjected to diffusion bonding, since Cu or Ag has good affinity with aluminum by reason of the common crystal structure (i.e., face-centered cubic lattice) shared by aluminum and Cu or Ag and the similarity in lattice constant thereof, even though Cu or Ag has high electrical conductivity and also has a melting point higher than that of aluminum.

Further, these insert materials easily become diffusion bonded to Cu in the metal structure of the electrodes. Then, the insert materials and the electrodes are fused and alloyed due to the diffusion bonding between the insert materials and the electrodes, so that the electrode life is shortened.

Furthermore, the corrosion due to the potential difference is caused by the diffusion bonding between the materials to be welded and the insert materials, and therefore, the external appearance of a product is damaged.

For instance, Japanese Utility Model Laid-open No. 3-116276 has disclosed a welding process using iron foil as insert materials in case of joining aluminum or aluminum alloys together by means of resistance welding.

However, when the same iron foil is continuously reused (e.g., continuously about two or three times) as the insert material, such iron foil insert materials gradually begin diffusion bonding to the aluminum material being welded. Then, when the iron is deposited on the materials by the diffusion bonding, the corrosion due to the potential difference between the iron and the materials to be welded is results in damage to external appearance of the product.

SUMMARY OF THE INVENTION

It is an object of the present invention to provide a resistance welding process for aluminum and aluminum alloy materials for enabling the remarkable improvement of the electrode life.

Another object of the present invention is to provide a resistance welding process for aluminum and aluminum alloy materials for enabling the welding without damaging the external appearance of a welded product by preventing the corrosion of the welded product.

In order to achieve the objects described above, a resistance welding process according to the first invention comprises the steps of preparing an insert material having an overall thickness of 0.02 to 1 mm including a sheet-like core material consisting of any one of iron, steel, copper and copper alloy and coated layers each having a thickness of 1 to 100 μm, consisting of any one of Ni, Ni alloy, Ti, Ti alloy, Nb, Nb alloy, Mo, Mo alloy, W, W alloy, Cr, Cr alloy, Co and Co alloy and formed on both surfaces of the sheet-like core material; interposing the insert material between each portion of mutually overlapped materials to be welded consisting of aluminum or aluminum alloy and each of upper and lower electrodes; and pressurizing the materials to be welded by the upper and lower electrodes to join the materials to be welded together.

The coated layers on both surfaces of the core material in each insert material may consist of the same metal or different metals of all the metals described above. Further, the coated layers on both surfaces of the core material may be different from each other in thickness so long as the thickness of each coated layer is in the range of 1 to 100 μm.

The coated layer can be formed on both surfaces of the core material in each insert material industrially by means of electroplating, hot dipping, chemical vapor deposition, cladding or the like.

According to the welding process described above, the welding current is applied from the upper and lower electrodes to the materials to be welded through the insert materials, and the pressurizing portion of the mutually overlapped materials to be welded is fused exothermally due to the electrical resistance between the overlapped materials to be welded. Then, the nugget is formed in each pressurized portion of the materials to be welded, so that the materials to be welded are joined together.

When the thickness of each coated layer in the insert material for use in the resistance welding process described above is less than 1 μm, the coated layers are fused even by such an appropriate welding current as the satisfactory nugget is formed, and therefore, the resultant coated layers come to be respectively deposited to the materials to be welded and the electrodes. On the other hand, when the thickness of each coated layer exceeds 100 μm, the calorific value of each insert material becomes large at the time of welding, and the materials to be welded are exothermally fused in excess. Therefore, the nuggets formed between the overlapped materials to be welded are exposed to the surfaces of the materials described above to result in giving a defective product. Further, in this case, the materials to be welded are respectively deposited to the insert materials.

Accordingly, it is necessary that the thickness of each coated layer is set to be within the range of 1 to 100 μm.

When the overall thickness of each insert material including the core material and the coated layers is less than 0.02 mm, the insert materials are easily fused even by the appropriate welding current, and thus respectively deposited to the electrodes and the materials to be welded. On the other hand, when the overall thickness of each insert material exceeds 1 mm, any nugget having a predetermined size cannot be formed by the appropriate welding current between the materials to be welded to result in lowering the strength of a joint portion. Further, it becomes difficult to automatically and smoothly feed the insert materials between the electrodes and the materials to be welded.

Therefore, it is necessary that the overall thickness of each insert material is set to be within the range of 0.02 to 1 mm.

In order to achieve the objects described above, a resistance welding process according to the second invention comprises the steps of preparing an insert material having an overall thickness of 0.02 to 1 mm including a sheet-like core material consisting of iron or steel and a coated layer having a thickness of 1 to 100 μm, consisting of Ti and formed on one surface of the sheet-like core material; interposing the insert material between each portion of mutually overlapped materials to be welded consisting of aluminum or aluminum alloy and each of upper and lower electrodes in such a state that the coated layer faces the material to be welded; and pressurizing the materials to be welded by the upper and lower electrodes to join the materials to be welded together.

The coated layer can be formed on one surface of the core material in each insert material industrially by means of electroplating, hot dipping, chemical vapor deposition, cladding or the like.

According to the welding process of the second invention described above, the welding current is applied from the upper and lower electrodes to the materials to be welded through the insert materials, and the pressurizing portion of the mutually overlapped materials to be welded is exothermally fused due to the electrical resistance between the materials to be welded. Then, the nugget is formed in each pressurized portion of the materials to be welded, so that the materials to be welded are joined together.

When the thickness of the coated layer in the insert material for use in the resistance welding process of the second invention described above is less than 1 μm, the coated layer is fused even by such an appropriate welding current as the satisfactory nugget is formed, and therefore, the resultant coated layer comes to be deposited to the material to be welded. On the other hand, when the thickness of the coated layer exceeds 100 μm, the calorific value of each insert material becomes large at the time of welding, and the materials to be welded are exothermally fused in excess. Therefore, the nuggets formed between the overlapped materials to be welded are exposed to the surfaces of the materials described above to result in giving a defective product. Further, in this case, the materials to be welded are respectively deposited to the insert materials.

Accordingly, it is necessary that the thickness of the coated layer is set to be within the range of 1 to 100 µm.

When the overall thickness of each insert material including the core material and the coated layer is less than 0.02 mm, the insert materials are easily fused even by the appropriate welding current, and thus respectively deposited to the electrodes and the materials to be welded. On the other hand, when the overall thickness of each insert material exceeds 1 mm, any nugget having a predetermined size cannot be formed by the appropriate welding current between the materials to be welded to result in lowering the strength of a joint portion. Further, it becomes difficult to automatically and smoothly feed the insert materials between the electrodes and the materials to be welded.

Accordingly, it is necessary that the overall thickness of each insert material is set to be within the range of 0.02 to 1 mm.

In order to achieve the objects described above, a resistance welding process according to the third invention comprises the steps of preparing an insert material consisting of Ti foil or Ni foil; interposing the insert material between each portion of mutually overlapped materials to be welded consisting of aluminum or aluminum alloy and each of upper and lower electrodes; and pressurizing the materials to be welded by the upper and lower electrodes to join the materials to be welded together. The thickness of each insert material is preferably set to be within the range of 10 to 100 µm.

According to the welding process of the third invention described above, the welding current is applied from the upper and lower electrodes to the materials to be welded through the insert materials, and the pressurizing portion of the mutually overlapped materials to be welded is exothermally fused due to the electrical resistance between the materials to be welded. Then, the nugget is formed in each pressurized portion of the materials to be welded, so that the materials to be welded are joined together.

In each of the resistance welding processes described above according to the invention, it is necessary that the welding current is set to a such a value as to obtain a heat input which makes it possible to fuse the materials to be welded so as to form nuggets satisfactorily, and which is in such a degree that the surface of each insert material is not fused.

As for a welding machine for use in each process described above, use may be made of any one of a single phase AC resistance welding machine, a single phase DC resistance welding machine, a three phase low frequency resistance welding machine, a three phase DC resistance welding machine, a condenser resistance spot welding machine, and an inverted resistance spot welding machine or the like.

When the insert materials used for each welding process described above are respectively fed between the materials to be welded and the electrodes, each insert material may be cut in an appropriate size prior to the welding, and then, the cut insert material may be put on a portion of each material to be welded or stuck thereon. In order to feed the insert materials most smoothly, it is preferable that each insert material is prepared in a tape-like shape, then wound around a reel, and continuously fed to a weld portion every time when one or several spots are welded while rolling each insert material around another reel.

With reference to the insert materials used for each welding process according to the invention, particularly, the metal constituting the surface of each insert material has a melting point far higher than those of aluminum and aluminum alloy, and also has thermal and electrical conductivities far lower than those of aluminum and aluminum alloy. Further, the metal described above is hardly subjected to the diffusion bonding to general electrode materials.

Because of the above-mentioned characteristics of the metal constituting the surface of each insert material, when the current is applied by the upper and lower electrodes to the materials to be welded, the materials to be welded can be heated and fused more speedily to help the more speedy formation of nuggets between the materials to be welded, and the coated layers and the electrodes can be sufficiently restrained from being fused and alloyed. Therefore, the electrode life can be remarkably improved.

Further, since the metal constituting the surface of each insert material is hardly subjected to the diffusion bonding to aluminum or aluminum alloy used as materials to be welded, the corrosion hardly occurs on the welded product, and the external appearance of the welded product is hardly damaged.

Each resistance welding process according to the invention relates to a process for welding aluminum or aluminum alloy materials, and otherwise is suitably used for joining alloy materials mainly such as Al—Si alloy, Al—Mg alloy, Al—Mg—Si alloy, Al—Cu—Mg alloy, Al—Zn—Mg alloy and Al—Zn—Cu—Mg alloy by means of resistance welding.

DESCRIPTION OF THE PREFERRED EMBODIMENT

A resistance welding process according to the invention will now be specifically described on the basis of examples as follows.

Figure 1:
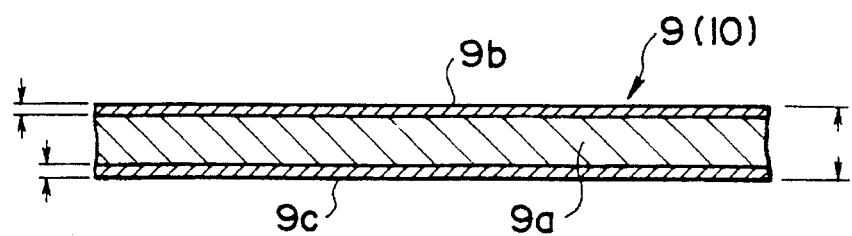
FIG. 1 is a fragmentary enlarged-scale sectional view showing an insert material for use in a resistance welding process according to the invention.

As shown in FIG. 1, each of insert materials 9 and 10 for use in a resistance welding process according to the invention comprises a sheet-like core material 9a consisting of iron, steel, copper or copper alloy and coated layers 9b and 9c respectively fixed to both surfaces of the core material 9a. The overall thickness T of each of the insert materials 9 and 10 is in the range of 0.02 to 1 mm. The material of the coated layers 9b and 9c is any one of Ni, Ni alloy, Ti, Ti alloy, Nb, Nb alloy, Mo, Mo alloy, W, W alloy, Cr, Cr alloy, Co and Co alloy, and each of the thicknesses t1 and t2 of the coated layers is in the range of 1 to 100 μm.

The coated layers 9b and 9c on both surfaces may consist of different metals from each other so long as the material thereof is any one of the metals described above. Further, both the coated layers 9b and 9c may be different from each other in thickness so long as the thickness of each coated layer is in the range of 1 to 100 μm.

The coated layers 9b and 9c are fixed to both surfaces of the core material 9a by means of electroplating, hot dipping, chemical vapor deposition, cladding or the like.

When the metal constituting the coated layer is Ti and the metal constituting the core material 9a is iron or steel, either of the coated layers 9b and 9c may be omitted.

Further, the insert materials 9 and 10 may consist of Ti foil or Ni foil.

EXAMPLE 1

As shown in Table 1, 17 kinds of samples of insert materials (which are samples prepared by electroplating both surfaces of a sheet-like Fe core material with Ni or Ni alloy as coated layers, and other samples prepared by electroplating respectively one surface of the Fe core material with Ni or Ni alloy and the other surface thereof with any one of Ti, Nb, Mo, W, Cr and Co as the coated layers) were prepared for use in the process of the invention. Also, 5 kinds of samples of insert materials other than those used for the example of the invention were prepared as comparative examples.

Then, the resistance spot welding was carried out according to the following procedure as to both the cases where the sample of each insert material described above was used and not used.

Figure 2:
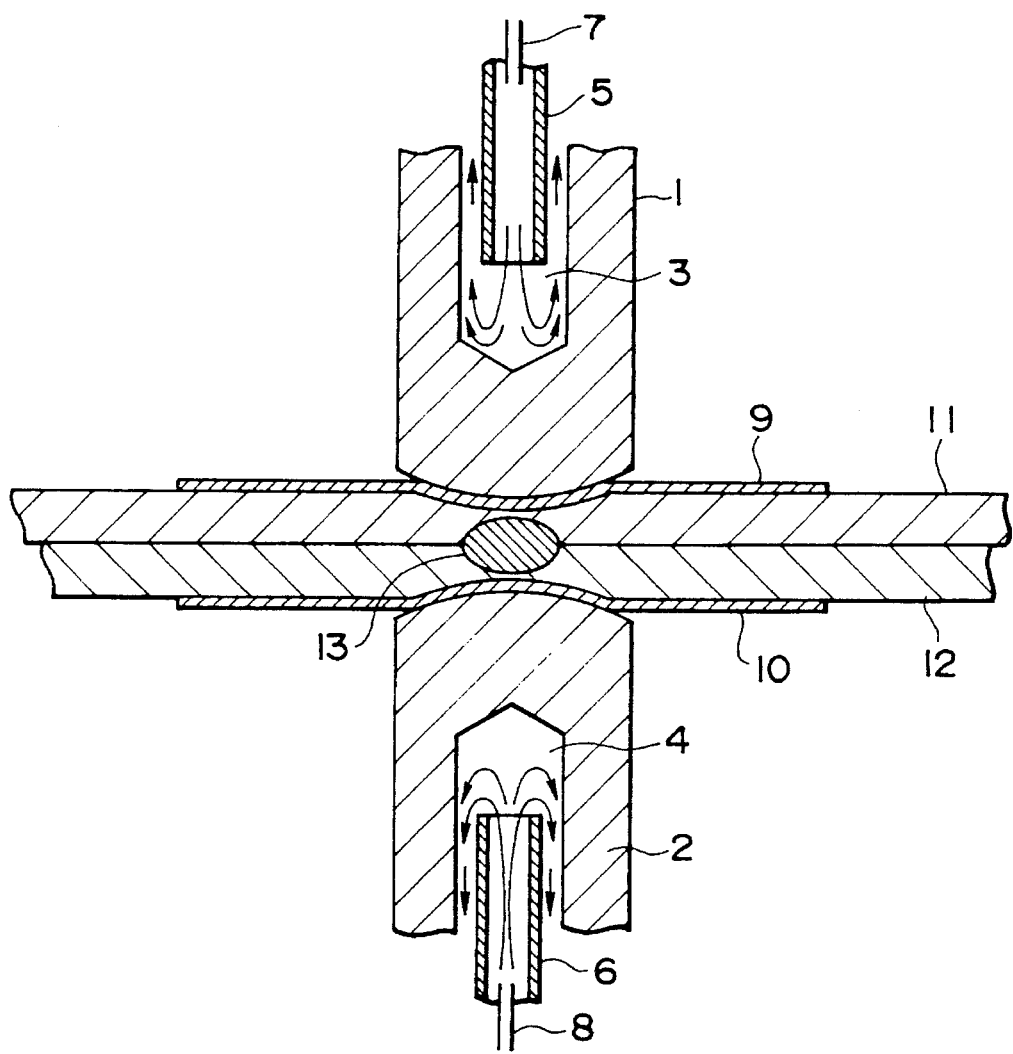
FIG. 2 is a fragmentary sectional view showing a resistance welding apparatus as an embodiment for use in a resistance welding process according to the invention.

The insert materials 9 and 10 each having the size of 30×200 mm were interposed respectively between the upper and under electrodes 1 and 2 and the overlapped materials to be welded 11 and 12 each having the size of 30×200 mm, and a single phase AC welding machine having the structure shown in FIG. 2 was used to carry out the welding up to 12000 times of continuous spot welding on welding conditions of welding current: 28000 A, electrode force: 3920N, weld time: 5 cycles and 30 mm pitch: 5 spots.

As for each of the upper and under electrodes 1 and 2, use was made of a radiused electrode consisting of Cr—Cu alloy (which corresponds to the second group of JIS Z 3234) of 16 mm in diameter and having the radiused tip end (R=80 mm). The tip end of each electrode was subjected to dressing by use of an emery cloth #1000 prior to the start of welding.

Cooling holes 3 and 4 of each 9 mm in diameter were opened respectively in the electrodes 1 and 2, and water 7 and 8 was poured to the holes 3 and 4 through conduits 5 and 6 at a flow rate of 3 l/min. to cool the electrodes 1 and 2.

Each of the materials to be welded 11 and 12 was 5182-O material consisting of Al—Mg alloy and having the thickness of 1 mm. The materials to be welded were used as they were kept in surface condition when received.

Figure 3:
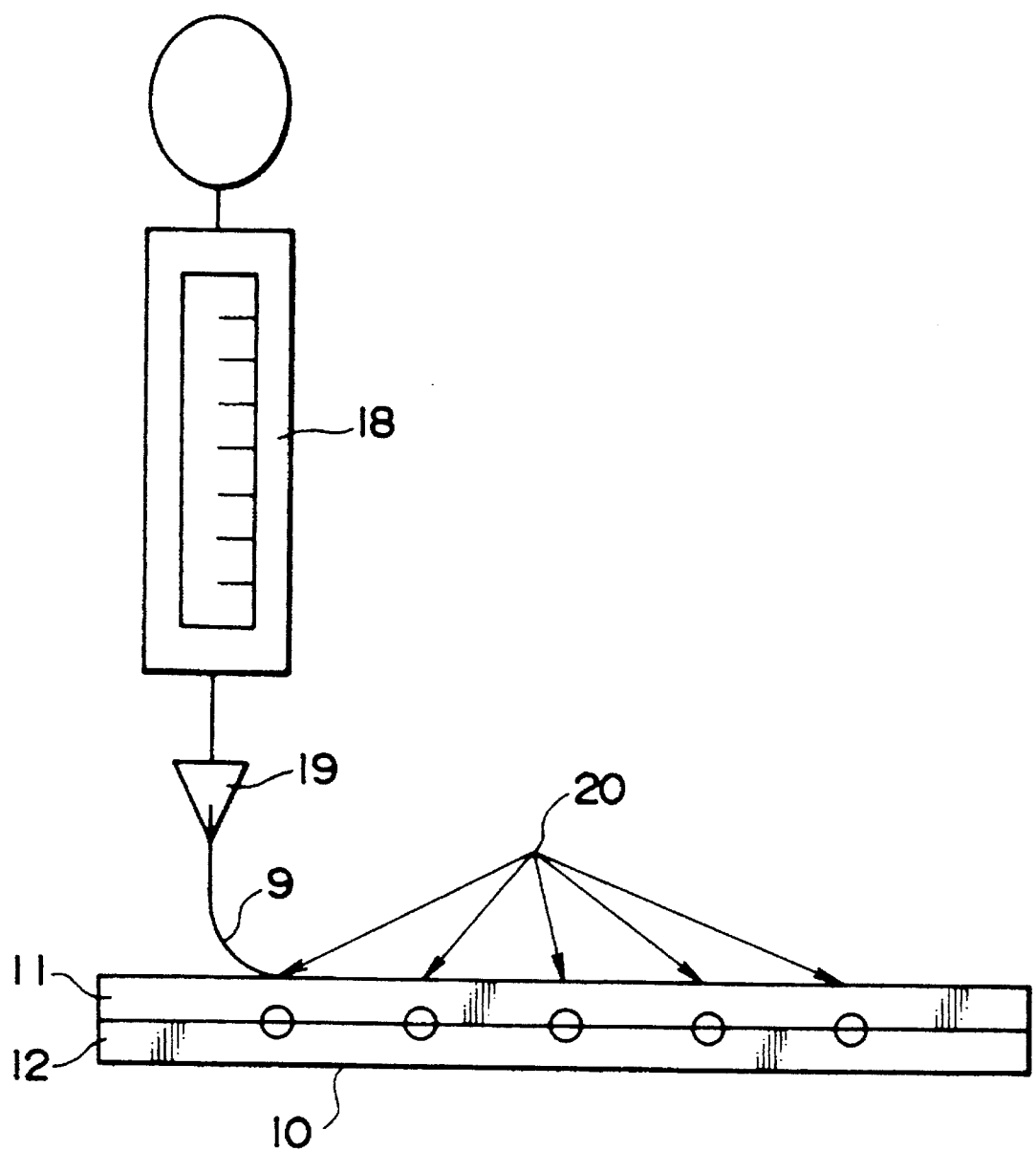
FIG. 3 is a front view showing a peeling load measuring device for insert materials.
Figure 4:
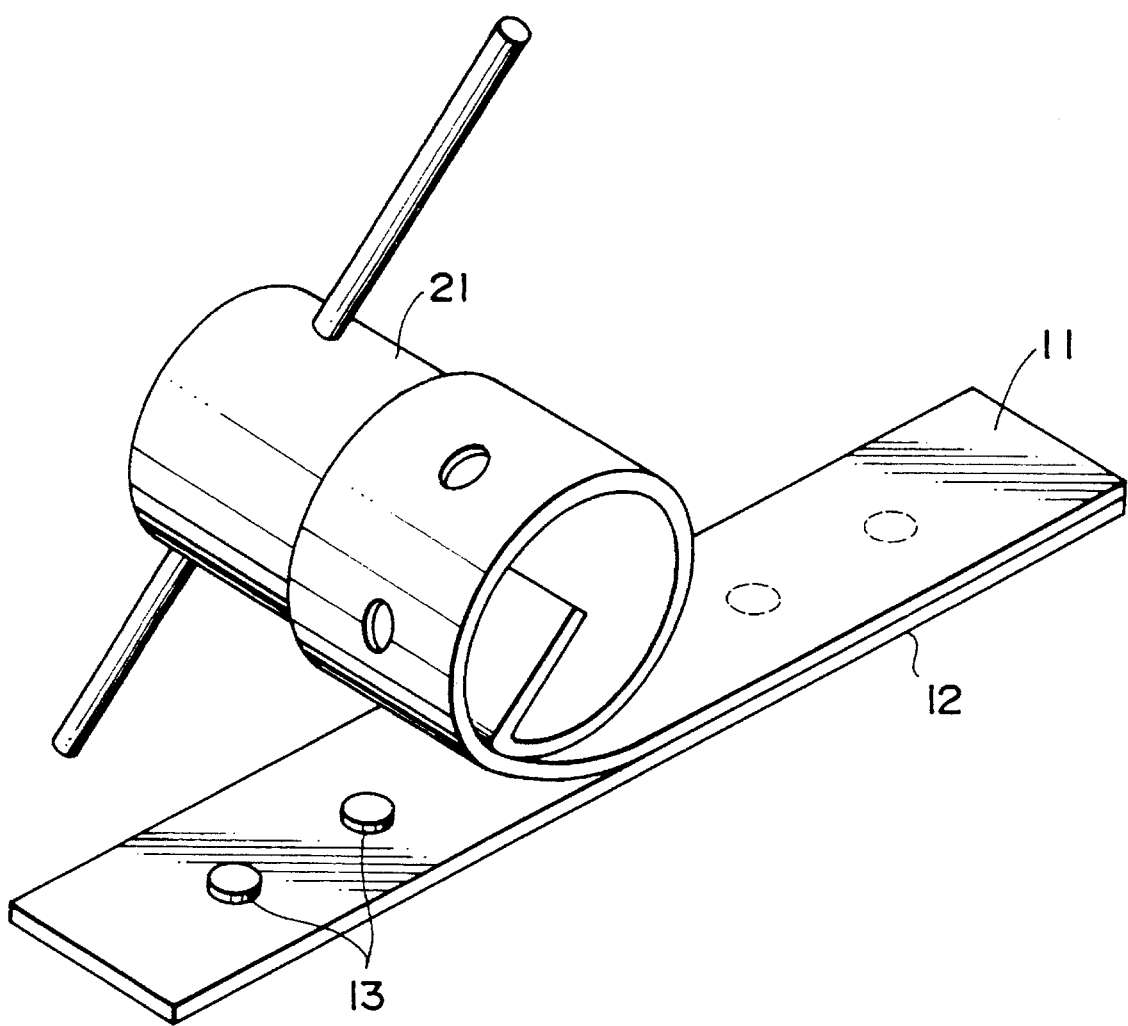
FIG. 4 is a perspective view showing a peeling tool for measuring a nugget with respect to a product resulting from the resistance spot welding according to an embodiment of the invention.

With respect to each test piece welded as described above, while assuming that the maximum allowance value is 150 g, the peeling load was measured by a spring balance 18 as shown in FIG. 3, when the insert material 9 was peeled from weld portions 20 of the materials to be welded 11 and 12. Further, as shown in FIG. 4, one end of the material to be welded 11 was pinched by a peeling tool 21, and then peeled off while rounding. Thereafter, the long and short diameters of a nugget 13 were measured by slide calipers, and the nugget diameter was calculated by the following equation to evaluate the electrode life.

Nugget diameter=(long diameter+short diameter)/2 mm

Incidentally, the minimum nugget diameter of 4 mm in the A class of JIS Z 3140 was adopted as the limit nugget diameter for the evaluation of the electrode life. The results thus obtained are shown in Table 1 with other data.

TABLE 1

| | Insert materials | | | | | | |
|---|---|---|---|---|---|---|---|
| | Coated metal on electrode side | | Material of core material | Overall thickness (μm) | Coated metal on material side | | Electrode life (Spot welding times) |
| Class | Materials | Thickness (μm) | | | Material | Thickness (μm) | |
| Example of the invention | Ni | 1 | Fe | 20 | Ni | 1 | Not less than 12000 |
| | Ni-15%Fe | 10 | Fe | 100 | Ni-15%Fe | 10 | " |
| | Ni | 100 | Fe | 1000 | Ni | 100 | " |
| | Ni-15%Fe | 1 | Fe | 20 | Ni | 1 | " |
| | Ni-15%Fe | 10 | Fe | 100 | Ti | 10 | " |
| | Ni-5%Zn | 100 | Fe | 1000 | Nb | 100 | " |
| | Ni-5%Zn | 1 | Fe | 20 | Mo | 1 | " |
| | Ni-10%Cr | 10 | Fe | 100 | W | 10 | " |
| | Ni-10%Cr | 100 | Fe | 500 | Cr | 100 | " |
| | Ni-10%Cr | 50 | Fe | 1000 | Co | 1 | " |
| | Ni | 1 | Fe | 20 | Ni-15%Fe | 1 | " |
| | Ti | 10 | Fe | 100 | Ni-15%Fe | 5 | " |
| | Nb | 100 | Fe | 1000 | Ni-5%Zn | 10 | " |
| | Mo | 2 | Fe | 20 | Ni-5%Zn | 1 | " |
| | W | 30 | Fe | 100 | Ni-10%Cr | 5 | " |
| | Cr | 50 | Fe | 500 | Ni-10%Cr | 10 | " |

TABLE 1-continued

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| Comparative example | Co | 1 | Fe | 1000 | Ni-10%Cr | 50 | " |
| | Ni | 0.8 | Fe | 30 | Ni | 0.8 | 1302 |
| | Ni-15%Fe | 150 | Fe | 500 | Ni | 150 | 1083 |
| | Ni-5%Zn | 5 | Fe | 18 | Ni | 5 | 253 |
| | Ni-10%Cr | 10 | Fe | 2000 | Ni | 10 | Unweldable |
| | Cu foil (Thickness 70 μm) | | | | | | 759 |
| | Any foils are not used. | | | | | | 451 |

As shown in Table 1, according to the example of the process of the invention, any electrode life was not less than 12000 times of spot welding, the peeling load of the insert material was not more than 150 g, and any nugget diameter was not less than 4 mm. When the state of the electrode tip after 12000 times of spot welding was examined by use of a pressure sensitive paper, there was almost no difference between the shape of the electrode tip prior to the start of welding and that after the welding.

On the other hand, in case of using the insert material in the comparative example, in which the thickness of each coated layer (Ni or Ni alloy) is less than 1 μm, the coated layers of the insert materials were fused at 1302 times of spot welding and deposited to the electrodes and the materials to be welded. In this case, the nugget diameter was not more than 4 mm.

In case of using the insert material in the comparative example, in which the thickness of each coated layer exceeds 100 μm, the insert materials were not deposited to the electrodes, while the nuggets were formed up to the surfaces of the materials to be welded at 1083 times of spot welding, and the materials to be welded were thus deposited to the insert materials.

In case of using the insert material in the comparative example, in which the overall thickness is less than 0.02 mm, the insert materials were fused by welding, and the electrode life was no more than 253 times of spot welding. On the other hand, in case of using the insert material in the comparative example, in which the overall thickness exceeds 1 mm, it was impossible to carry out the welding.

In case of using the insert material consisting of Cu element, the electrode life was 759 times of spot welding.

In case of welding without using any insert material, the nugget became smaller in diameter than that of a standard size at 451 times of spot welding. At this time, the center portions of the tip ends of the upper and under electrodes have been already formed concavely at 50 times of spot welding. The more the number of times of spot welding was, the larger the electrode diameter became, and the contact with the materials to be welded became worse.

As described above, according to the resistance welding process in the example of the invention, the electrode life was not less than 10 times as much as that in case of any comparative examples.

EXAMPLE 2

As shown in Table 2, 17 kinds of samples of insert materials (which are samples prepared by electroplating both surfaces of a sheet-like Fe core material with Ti or Ti alloy as coated layers, and other samples prepared by electroplating respectively one surface of the Fe core material with Ti or Ti alloy and the other surface with any one of Ni, Nb, Mo, W, Cr and Co as the coated layers) were prepared for use in the process of the invention. Further, 5 kinds of samples of insert materials other than those used for the example of the invention were prepared as comparative examples.

The resistance spot welding was carried out according to the following procedure as to both the cases where the sample of each insert material was used and not used.

Figure 5:
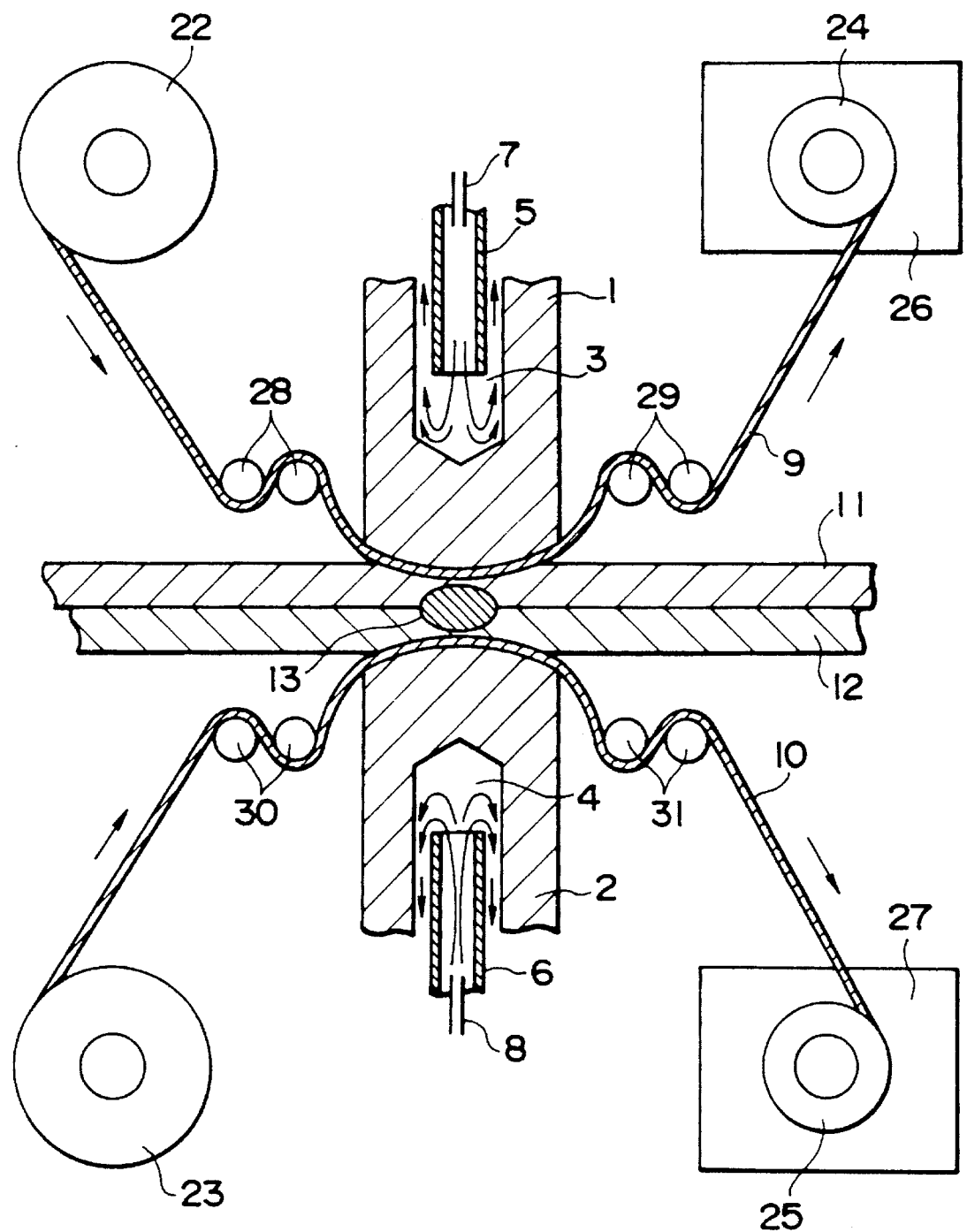
FIG. 5 is a fragmentary sectional view showing a resistance welding apparatus as another embodiment for use in a resistance welding process according to the invention.

The insert materials 9 and 10 each prepared in a tape-like shape of 16 mm in width were respectively fed to between the upper and under electrodes 1 and 2 and the overlapped materials to be welded 11 and 12 each having the size of 30×200 mm, and a single phase DC welding machine having the structure shown in FIG. 5 was used to carry out the welding up to 12000 times of continuous spot welding on welding conditions of welding current: 28000 A, electrode force: 3920N, weld time: 5 cycles and 30 mm pitch: 5 spots.

The insert materials 9 and 10 were respectively held by hold reels 22 and 23 and then automatically fed to between the upper and lower electrodes 1 and 2 and the materials to be welded 11 and 12, while rolling the insert materials around take up reels 24 and 25 through guide rollers 28, 29, 30 and 31. Reference numerals 26 and 27 respectively designate drive motors for the take-up reels 24 and 25.

As for each of the upper and lower electrodes 1 and 2, use was made of a dome-radiused electrode as a new product consisting of Cr—Cu alloy (which corresponds to the second group of JIS Z 3234) of 16 mm in diameter and having the dome-radiused tip end. The electrodes 1 and 2 were cooled similarly to the case of example 1.

Each of the materials to be welded 11 and 12 was 5052-O material consisting of Al—Mg alloy and having the thickness of 1 mm. These materials to be welded were used as they were kept in surface condition when received.

With respect to each case, the electrode life was evaluated similarly to the case of example 1. The results thus obtained are shown in Table 2 with other data.

TABLE 2

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Ti | 1 | Fe | 20 | Ti | 1 | Not less than 12000 |
| | Ti | 10 | Fe | 100 | Ti | 10 | " |
| | Ti | 100 | Fe | 1000 | Ti | 100 | " |
| | Ti-2%Fe | 1 | Fe | 20 | Ni | 1 | " |
| | Ti-2%Fe | 10 | Fe | 100 | Ti | 10 | " |
| | Ti-2%Fe | 100 | Fe | 1000 | Nb | 100 | " |
| | Ti-2%Al | 1 | Fe | 20 | Mo | 1 | " |
| | Ti-2%Al | 10 | Fe | 100 | W | 10 | " |
| | Ti-2%Al | 100 | Fe | 500 | Cr | 100 | " |
| | Ti-2%Al | 50 | Fe | 1000 | Co | 1 | " |
| | Ni | 1 | Fe | 20 | Ti-2%Fe | 1 | " |
| | Ti | 10 | Fe | 100 | Ti-2%Fe | 5 | " |
| | Nb | 100 | Fe | 1000 | Ti-2%Fe | 10 | " |
| | Mo | 2 | Fe | 20 | Ti-2%Al | 1 | " |
| | W | 30 | Fe | 100 | Ti-2%Al | 5 | " |
| | Cr | 50 | Fe | 500 | Ti-2%Al | 10 | " |
| | Co | 1 | Fe | 1000 | Ti-2%Al | 50 | " |
| Comparative example | Ti | 0.8 | Fe | 30 | Ti | 0.8 | 1213 |
| | Ti-2%Fe | 150 | Fe | 500 | Ti | 150 | 1005 |
| | Ti-2%Al | 5 | Fe | 18 | Ti | 5 | 241 |
| | Ti | 10 | Fe | 2000 | Ti | 10 | Unweldable |
| | Cu foil (Thickness 70 μm) | | | | | | 746 |
| | Any foils are not used. | | | | | | 309 |

EXAMPLE 3

As shown in Table 3, 17 kinds of samples of insert materials (which are samples prepared by electroplating both surfaces of a sheet-like Fe core material with Nb or Nb alloy as coated layers, and other samples prepared by electroplating respectively one surface of the Fe core material with Nb or Nb alloy and the other surface thereof with any one of Ni, Ti, Mo, W, Cr and Co as the coated layers) were prepared for use in a process of the invention. Further, 5 kinds of samples of insert materials other than those used for the example of the invention were prepared as comparative examples.

The resistance spot welding was carried out according to the following procedure as to both the cases where the sample of each insert material was used and not used.

The insert materials 9 and 10 each having the size of 30×200 mm were interposed respectively between the upper and lower electrodes 1 and 2 and the overlapped materials to be welded 11 and 12 (6009-T4 materials each consisting of Al—Mg—Si alloy and having the thickness of 1 mm) each having the size of 30×200 mm, and the single phase AC welding machine having the structure shown in FIG. 2 was used to carry out the welding up to 12000 times of continuous spot welding on welding conditions of welding current: 28000 A, electrode force: 3920N, weld time: 8 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 3 with other data.

TABLE 3

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Nb | 1 | Fe | 20 | Nb | 1 | Not less than 12000 |
| | Nb | 10 | Fe | 100 | Nb | 10 | " |
| | Nb | 100 | Fe | 1000 | Nb | 100 | " |
| | Nd-2%Ti | 1 | Fe | 20 | Ni | 1 | " |
| | Nd-2%Ti | 10 | Fe | 100 | Ti | 10 | " |
| | Nd-2%Ti | 100 | Fe | 1000 | Nb | 100 | " |
| | Nd-2%Zr | 1 | Fe | 20 | Mo | 1 | " |
| | Nd-2%Zr | 10 | Fe | 100 | W | 10 | " |

TABLE 3-continued

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| | Nd-2%Zr | 100 | Fe | 500 | Cr | 100 | " |
| | Nd-2%Zr | 50 | Fe | 1000 | Co | 1 | " |
| | Ni | 1 | Fe | 20 | Nd-2%Ti | 1 | " |
| | Ti | 10 | Fe | 100 | Nd-2%Ti | 5 | " |
| | Nb | 100 | Fe | 1000 | Nd-2%Ti | 10 | " |
| | Mo | 2 | Fe | 20 | Nd-2%Zr | 1 | " |
| | W | 30 | Fe | 100 | Nd-2%Zr | 5 | " |
| | Cr | 50 | Fe | 500 | Nd-2%Zr | 10 | " |
| | Co | 1 | Fe | 1000 | Nd-2%Zr | 50 | " |
| Comparative example | Nb | 0.8 | Fe | 30 | Nb | 0.8 | 1556 |
| | Nb-2%Ti | 150 | Fe | 500 | Nb | 150 | 1463 |
| | Nb-2%Zr | 5 | Fe | 18 | Nb | 5 | 442 |
| | Nb | 10 | Fe | 2000 | Nb | 10 | Unweldable |
| | Cu foil (Thickness 70 μm) | | | | | | 852 |
| | Any foils are not used. | | | | | | 338 |

EXAMPLE 4

As shown in Table 4, 17 kinds of samples of insert materials (which are samples prepared by electroplating both surfaces of a sheet-like Fe core material with Cr or Cr alloy as coated layers, and other samples prepared by electroplating respectively one surface of the Fe core material with Cr or Cr alloy and the other surface thereof with any one of Ni, Ti, Nb, Mo, W and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 were interposed respectively between the upper and under electrodes 1 and 2 (radiused electrodes each consisting of Cr—Zr—Cu alloy of 16 mm in diameter, which corresponds to the second group of JIS Z 3234, and having the radiused tip end of 80 mm in R) and the overlapped materials to be welded 11 and 12 (5182-O materials each consisting of Al—Mg alloy and having the thickness of 1 mm), and the single phase AC welding machine having the structure shown in FIG. 2 was used to carry out the welding up to 12000 times of continuous spot welding on welding conditions of welding current: 28000 A, electrode force: 3920N, weld time: 7 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 4 with other data.

TABLE 4

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Cr | 1 | Fe | 20 | Cr | 1 | Not less than 12000 |
| | Cr | 10 | Fe | 100 | Cr | 10 | " |
| | Cr | 100 | Fe | 1000 | Cr | 100 | " |
| | Cr-1%Fe | 1 | Fe | 20 | Ni | 1 | " |
| | Cr-1%Fe | 10 | Fe | 100 | Ti | 10 | " |
| | Cr-1%Fe | 100 | Fe | 1000 | Nb | 50 | " |
| | Cr-1%Ni | 1 | Fe | 20 | Mo | 1 | " |
| | Cr-1%Ni | 10 | Fe | 100 | W | 10 | " |
| | Cr-1%Ni | 100 | Fe | 500 | Cr | 50 | " |
| | Cr-1%Ni | 10 | Fe | 1000 | Co | 10 | " |
| | Ni | 1 | Fe | 20 | Cr-1%Fe | 1 | " |
| | Ti | 10 | Fe | 100 | Cr-1%Fe | 10 | " |
| | Nb | 100 | Fe | 1000 | Cr-1%Fe | 100 | " |
| | Mo | 2 | Fe | 20 | Cr-1%Ni | 1 | " |

TABLE 4-continued

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| | W | 5 | Fe | 100 | Cr-1%Ni | 10 | " |
| | Cr | 5 | Fe | 500 | Cr-1%Ni | 100 | " |
| | Co | 5 | Fe | 1000 | Cr-1%Ni | 10 | " |
| Comparative example | Cr-1%Fe | 0.8 | Fe | 30 | Cr | 0.8 | 1195 |
| | Cr-1%Fe | 150 | Fe | 500 | Cr | 150 | 1028 |
| | Cr-1%Fe | 5 | Fe | 18 | Cr | 5 | 198 |
| | Cr-1%Ni | 10 | Fe | 2000 | Cr | 10 | Unweldable |
| | Cu foil (Thickness 70 μm) | | | | | | 683 |
| | Any foils are not used. | | | | | | 287 |

EXAMPLE 5

As shown in Table 5, 17 kinds of samples of insert materials (which are samples prepared by electroplating both surfaces of a sheet-like Fe core material with Co or Co alloy as coated layers or other samples prepared by electroplating respectively one surface of the Fe core material with Co or Co alloy and the other surface thereof with any one of Ni, Ti, Nb, Mo, W and Cr as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

Figure 6:
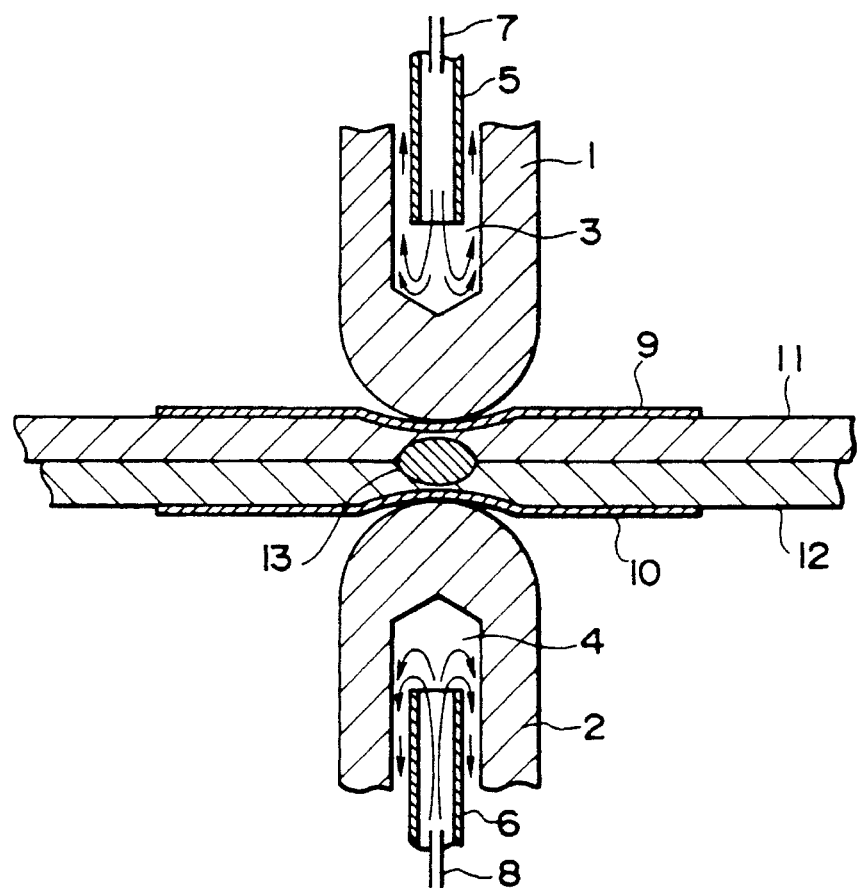
FIG. 6 is a fragmentary sectional view showing a resistance welding apparatus as a further embodiment for use in a resistance welding process according to the invention.
Figure 7:
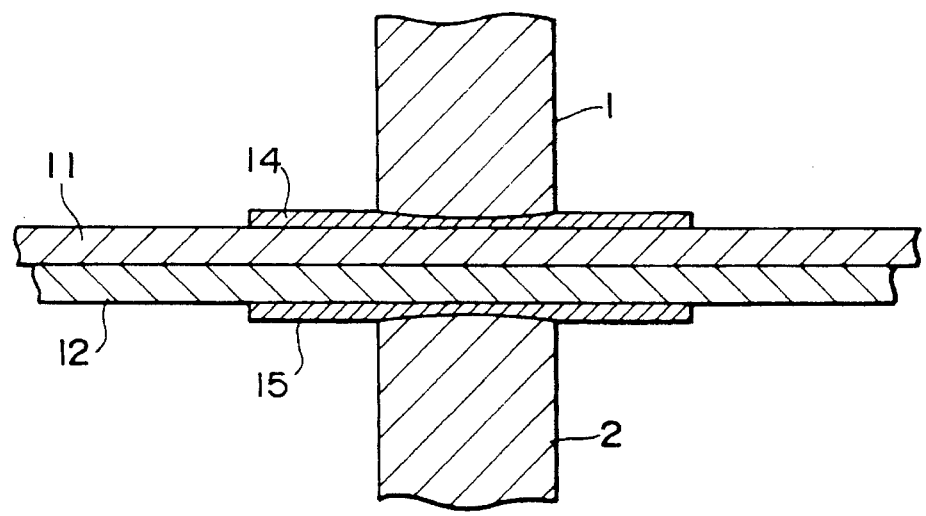
FIG. 7 is a fragmentary sectional view of a welding apparatus for explaining a prior art resistance welding process for aluminum and aluminum alloy materials.

The insert materials 9 and 10 each having the size of 30×200 mm were interposed respectively between the upper and lower electrodes 1 and 2 (dome-radiused electrodes each consisting of Cr—Cu alloy of 16 mm in diameter, which corresponds to the second group of JIS Z 3234, and having the dome-radiused tip end) and the overlapped materials to be welded 11 and 12 (5182-O materials each consisting of Al—Mg alloy and having the thickness of 1 mm), and the single phase AC welding machine having the structure shown in FIG. 6 was used to carry out the welding up to 12000 times of continuous spot welding on welding conditions of welding current: 28000 A, electrode force: 3920N, weld time: 5 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 5 with other data.

TABLE 5

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Co | 1 | Fe | 20 | Co | 1 | Not less than 12000 |
| | Co | 10 | Fe | 100 | Co | 10 | " |
| | Co | 100 | Fe | 1000 | Co | 100 | " |
| | Co-5%Cr | 1 | Fe | 20 | Ni | 1 | " |
| | Co-5%Cr | 10 | Fe | 100 | Ti | 10 | " |
| | Co-5%Cr | 100 | Fe | 1000 | Nb | 50 | " |
| | Co-5%Mn | 1 | Fe | 20 | Mo | 1 | " |
| | Co-5%Mn | 10 | Fe | 100 | W | 10 | " |
| | Co-5%Mn | 100 | Fe | 500 | Cr | 50 | " |
| | Co-5%Mn | 10 | Fe | 1000 | Co | 10 | " |
| | Ni | 1 | Fe | 20 | Co-5%Cr | 1 | " |
| | Ti | 10 | Fe | 100 | Co-5%Cr | 10 | " |
| | Nb | 100 | Fe | 1000 | Co-5%Cr | 100 | " |
| | Mo | 2 | Fe | 20 | Co-5%Mn | 1 | " |
| | W | 5 | Fe | 100 | Co-5%Mn | 10 | " |
| | Cr | 5 | Fe | 500 | Co-5%Mn | 100 | " |
| | Co | 5 | Fe | 1000 | Co-5%Mn | 10 | " |
| Comparative example | Co-5%Cr | 0.8 | Fe | 30 | Co | 0.8 | 1211 |
| | Co-5%Cr | 150 | Fe | 500 | Co | 150 | 1052 |
| | Co-5%Mn | 5 | Fe | 18 | Co | 5 | 322 |

TABLE 5-continued

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| | Co-5%Mn | 10 | Fe | 2000 | Co | 10 | Unweldable |
| | Cu foil (Thickness 70 μm) | | | | | | 832 |
| | Any foils are not used. | | | | | | 598 |

EXAMPLE 6

As shown in Table 6, 17 kinds of samples of insert materials (which are samples prepared by electroplating both surfaces of a sheet-like Cu or Cu alloy core material with Ni or Ni alloy as coated layers, and other samples prepared by electroplating respectively one surface of the Cu or Cu alloy core material with Ni or Ni alloy and the other surface thereof with any one of Ti, Nb, Mo, W, Cr and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and lower electrodes 1 and 2 (radiused electrodes each consisting of Cr—Cu alloy of 16 mm in diameter, which corresponds to the second group of JIS Z 3234, and having the radiused tip end of 80 mm in R) and the overlapped materials to be welded 11 and 12 (5182-O materials each consisting of Al—Mg alloy and having the thickness of 1 mm) each having the size of 30×200 mm, and the single phase AC welding machine having the structure shown in FIG. 2 was used to carry out the welding up to 12000 times of continuous spot welding on welding conditions of welding current: 23000 A, electrode force: 2940N, weld time: 5 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 6 with other data.

TABLE 6

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| Example of the invention | Ni | 1 | Cu | 20 | Ni | 1 | Not less than 12000 |
| | Ni-15%Fe | 10 | Cu | 100 | Ni-15%Fe | 10 | " |
| | Ni | 100 | Cu | 1000 | Ni | 100 | " |
| | Ni-15%Fe | 1 | Cu-1%Cr | 20 | Ni | 1 | " |
| | Ni-15%Fe | 10 | Cu-1%Cr | 100 | Ti | 10 | " |
| | Ni-5%Zn | 100 | Cu-1%Cr | 1000 | Nb | 100 | " |
| | Ni-5%Zn | 1 | Cu | 20 | Mo | 1 | " |
| | Ni-10%Cr | 10 | Cu | 100 | W | 10 | " |
| | Ni-10%Cr | 100 | Cu | 500 | Cr | 100 | " |
| | Ni-10%Cr | 50 | Cu | 1000 | Co | 1 | " |
| | Ni | 1 | Cu-1%Cr | 20 | Ni-15%Fe | 1 | " |
| | Ti | 10 | Cu-1%Cr | 100 | Ni-15%Fe | 5 | " |
| | Nb | 100 | Cu-1%Cr | 1000 | Ni-5%Zn | 10 | " |
| | Mo | 2 | Cu | 20 | Ni-5%Zn | 1 | " |
| | W | 30 | Cu | 100 | Ni-10%Cr | 5 | " |
| | Cr | 50 | Cu | 500 | Ni-10%Cr | 10 | " |
| | Co | 1 | Cu | 1000 | Ni-10%Cr | 50 | " |
| Comparative example | Ni | 0.8 | Cu | 30 | Ni | 0.8 | 1452 |
| | Ni-15%Fe | 150 | Cu-1%Cr | 500 | Ni | 150 | 1681 |
| | Ni-5%Zn | 5 | Cu | 18 | Ni | 5 | 1513 |
| | Ni-10%Cr | 10 | Cu-1%Cr | 2000 | Ni | 10 | Unweldable |
| | Cu foil (Thickness 70 μm) | | | | | | 760 |
| | Any foils are not used. | | | | | | 455 |

EXAMPLE 7

As shown in Table 7, 17 kinds of samples of insert materials (which are samples prepared by electroplating both surfaces of a sheet-like Cu or Cu alloy core material with Ti or Ti alloy as coated layers, and other samples prepared by electroplating respectively one surface of the Cu or Cu alloy core material with Ti or Ti alloy and the other surface thereof with any one of Ni, Nb, Mo, W, Cr and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

Similarly to the case of example 2, while the tape-like insert materials 9 and 10 each having the width of 16 mm were automatically fed to between the upper and under electrodes 1 and 2 (dome-radiused electrodes each consisting of Cr—Cu alloy of 16 mm in diameter, which corresponds to the second group of JIS Z 3234, and having the dome-radiused tip end) and the overlapped materials to be welded 11 and 12 (5052-O materials each consisting of Al—Mg alloy and having the thickness of 1 mm) each having the size of 30×200 mm, the single phase DC resistance welding machine having the structure shown in FIG. 5 was used to carry out the welding up to 12000 times of continuous spot welding on welding conditions of welding current: 25000 A, electrode force: 2940N, weld time: 5 cycles and 30 mm pitch: 5 spots.

The additional conditions were similar to those in the case of example 2.

Then, with respect to each case, the electrode life was evaluated similarly to the case of example 2.

The results thus obtained are shown in Table 7 with other data.

with Nb or Nb alloy as coated layers, and other samples prepared by electroplating respectively one surface of the Cu or Cu alloy core material with Nb or Nb alloy and the other surface thereof with any one of Ni, Ti, Mo, W, Cr and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and lower electrodes 1 and 2 (radiused electrodes each consisting of Cr—Cu alloy of 16 mm in diameter, which corresponds to the second group of JIS Z 3234, and having the radiused tip end of 80 mm in R) and the overlapped materials to be welded 11 and 12 (6009-T4 materials each consisting of Al—Mg—Si alloy and having the thickness of 1 mm) each having the size of 30×200 mm, and the single phase AC welding machine having the structure shown in FIG. 2 was used to carry out the welding up to 12000 times of continuous spot welding on welding conditions of welding current: 27000 A, electrode force: 2450N, weld time: 8 cycles and 30 mm pitch: 5 spots.

The additional conditions were similar to those in the case of example 1.

Then, with respect to each case, the peel test for the insert materials was made and the electrode life was evaluated similarly to the case of example 1.

TABLE 7

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Ti | 1 | Cu | 20 | Ti | 1 | Not less than 12000 |
| | Ti | 10 | Cu | 100 | Ti | 10 | " |
| | Ti | 100 | Cu | 1000 | Ti | 100 | " |
| | Ti-2%Fe | 1 | Cu-1%Cr | 20 | Ni | 1 | " |
| | Ti-2%Fe | 10 | Cu-1%Cr | 100 | Ti | 10 | " |
| | Ti-2%Fe | 100 | Cu-1%Cr | 1000 | Nb | 100 | " |
| | Ti-2%Al | 1 | Cu | 20 | Mo | 1 | " |
| | Ti-2%Al | 10 | Cu | 100 | W | 10 | " |
| | Ti-2%Al | 100 | Cu | 500 | Cr | 100 | " |
| | Ti-2%Al | 50 | Cu | 1000 | Co | 1 | " |
| | Ni | 1 | Cu-1%Cr | 20 | Ti-2%Fe | 1 | " |
| | Ti | 10 | Cu-1%Cr | 100 | Ti-2%Fe | 5 | " |
| | Nb | 100 | Cu-1%Cr | 1000 | Ti-2%Fe | 10 | " |
| | Mo | 2 | Cu | 20 | Ti-2%Al | 1 | " |
| | W | 30 | Cu | 100 | Ti-2%Al | 5 | " |
| | Cr | 50 | Cu | 500 | Ti-2%Al | 10 | " |
| | Co | 1 | Cu | 1000 | Ti-2%Al | 50 | " |
| Comparative example | Ti | 0.8 | Cu | 30 | Ti | 0.8 | 1314 |
| | Ti-2%Fe | 150 | Cu-1%Cr | 500 | Ti | 150 | 1580 |
| | Ti-2%Al | 5 | Cu | 18 | Ti | 5 | 1422 |
| | Ti | 10 | Cu-1%Cr | 2000 | Ti | 10 | Unweldable |
| | Cu foil (Thickness 70 μm) | | | | | | 712 |
| | Any foils are not used. | | | | | | 401 |

EXAMPLE 8

As shown in Table 8, 17 kinds of samples of insert materials (which are samples prepared by electroplating both surfaces of a sheet-like Cu or Cu alloy core material The results thus obtained are shown in Table 8 with other data.

TABLE 8

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Nb | 1 | Cu | 20 | Nb | 1 | Not less than 12000 |
| | Nb | 10 | Cu | 100 | Nb | 10 | " |
| | Nb | 100 | Cu | 1000 | Nb | 100 | " |
| | Nd-2%Ti | 1 | Cu-1%Cr | 20 | Ni | 1 | " |
| | Nd-2%Ti | 10 | Cu-1%Cr | 100 | Ti | 10 | " |
| | Nd-2%Ti | 100 | Cu-1%Cr | 1000 | Nb | 100 | " |
| | Nd-2%Zr | 1 | Cu | 20 | Mo | 1 | " |
| | Nd-2%Zr | 10 | Cu | 100 | W | 10 | " |
| | Nd-2%Zr | 100 | Cu | 500 | Cr | 100 | " |
| | Nd-2%Zr | 50 | Cu | 1000 | Co | 1 | " |
| | Ni | 1 | Cu-1%Cr | 20 | Nd-2%Ti | 1 | " |
| | Ti | 10 | Cu-1%Cr | 100 | Nd-2%Ti | 5 | " |
| | Nb | 30 | Cu-1%Cr | 1000 | Nd-2%Ti | 10 | " |
| | Mo | 2 | Cu | 20 | Nd-2%Zr | 1 | " |
| | W | 30 | Cu | 100 | Nd-2%Zr | 5 | " |
| | Cr | 50 | Cu | 500 | Nd-2%Zr | 10 | " |
| | Co | 1 | Cu | 1000 | Nd-2%Zr | 50 | " |
| Comparative example | Nb | 0.8 | Cu | 30 | Nb | 0.8 | 1584 |
| | Nb-2%Ti | 150 | Cu-1%Cr | 500 | Nb | 150 | 1751 |
| | Nb-2%Zr | 5 | Cu | 18 | Nb | 5 | 1631 |
| | Nb | 10 | Cu-1%Cr | 2000 | Nb | 10 | Unweldable |
| | Cu foil (Thickness 70 μm) | | | | | | 755 |
| | Any foils are not used. | | | | | | 439 |

EXAMPLE 9

As shown in Table 9, 17 kinds of samples of insert materials (which are samples prepared by electroplating both surfaces of a sheet-like Cu or Cu alloy core material with Mo or Mo alloy as coated layers, and other samples prepared by electroplating respectively one surface of the Cu or Cu alloy core material with Mo or Mo alloy and the other surface thereof with any one of Ni, Ti, Nb, W, Cr and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and lower electrodes 1 and 2 (dome-radiused electrodes each consisting of Cr—Cu alloy of 16 mm in diameter, which corresponds to the second group of JIS Z 3234, and having the dome-radiused tip end) and the overlapped materials to be welded 11 and 12 (5083-O materials each consisting of Al—Mg alloy and having the thickness of 1 mm) each having the size of 30×200 mm, and the single phase AC welding machine having the structure shown in FIG. 2 was used to carry out the welding up to 12000 times of continuous spot welding on welding conditions of welding current: 25000 A, electrode force: 2650N, weld time: 5 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 9 with other data.

TABLE 9

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | Mo | 1 | Cu | 20 | Mo | 1 | Not less than 12000 |
| | Mo | 10 | Cu | 100 | Mo | 10 | " |
| | Mo | 100 | Cu | 1000 | Mo | 100 | " |
| | Mo-1%Ti | 1 | Cu-1%Cr | 20 | Ni | 1 | " |
| | Mo-1%Ti | 10 | Cu-1%Cr | 100 | Ti | 10 | " |
| | Mo-1%Ti | 100 | Cu-1%Cr | 1000 | Nb | 50 | " |
| | Mo-1%Zr | 1 | Cu | 20 | Mo | 1 | " |
| | Mo-1%Zr | 10 | Cu | 100 | W | 10 | " |
| | Mo-1%Zr | 100 | Cu | 500 | Cr | 50 | " |
| | Mo-1%Zr | 10 | Cu | 1000 | Co | 10 | " |

TABLE 9-continued

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| | Ni | 1 | Cu-1%Cr | 20 | Mo-1%Ti | 1 | " |
| | Ti | 10 | Cu-1%Cr | 100 | Mo-1%Ti | 10 | " |
| | Nb | 100 | Cu-1%Cr | 1000 | Mo-1%Ti | 100 | " |
| | Mo | 2 | Cu | 20 | Mo-1%Zr | 1 | " |
| | W | 5 | Cu | 100 | Mo-1%Zr | 10 | " |
| | Cr | 5 | Cu | 500 | Mo-1%Zr | 100 | " |
| | Co | 5 | Cu | 1000 | Mo-1%Zr | 10 | " |
| Comparative example | Mo | 0.8 | Cu | 30 | Mo | 0.8 | 1325 |
| | Mo-1%Ti | 150 | Cu-1%Cr | 500 | Mo | 150 | 1553 |
| | Mo-1%Zr | 5 | Cu | 18 | Mo | 5 | 1421 |
| | Mo | 10 | Cu-1%Cr | 2000 | Mo | 10 | Unweldable |
| | Cu foil (Thickness 70 μm) | | | | | | 732 |
| | Any foils are not used. | | | | | | 516 |

EXAMPLE 10

As shown in Table 10, 17 kinds of samples of insert materials (which are samples prepared by electroplating both surfaces of a sheet-like Cu or Cu alloy core material with W or W alloy as coated layers, and other samples prepared by electroplating respectively one surface of the Cu or Cu alloy core material with W or W alloy and the other surface thereof with any one of Ni, Ti, Nb, Mo, Cr and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

While the insert materials 9 and 10 each having the width of 16 mm were automatically fed to between the upper and under electrodes 1 and 2 (radiused electrodes each consisting of Cr—Zr—Cu alloy of 16 mm in diameter, which corresponds to the second group of JIS Z 3234, and having the radiused tip end of 80 mm in R) and the overlapped materials to be welded 11 and 12 (5182-O materials each consisting of Al—Mg alloy and having the thickness of 1 mm) each having the size of 30×200 mm, the single phase DC resistance welding machine having the structure shown in FIG. 5 was used to carry out the welding up to 12000 times of continuous spot welding on welding conditions of welding current: 26000 A, electrode force: 2650N, weld time: 5 cycles and 30 mm pitch: 5 spots.

The additional conditions were similar to those in the case of example 2.

Then, with respect to each case, the electrode life was evaluated similarly to the case of example 2.

The results thus obtained are shown in Table 10 with other data.

TABLE 10

| Class | Insert materials | | | | | | Electrode life (Spot welding times) |
|---|---|---|---|---|---|---|---|
| | Coated metal on electrode side | | Material of core material | Overall thickness (μm) | Coated metal on material side | | |
| | Materials | Thickness (μm) | | | Material | Thickness (μm) | |
| Example of the invention | W | 1 | Cu | 20 | W | 1 | Not less than 12000 |
| | W | 10 | Cu | 100 | W | 10 | " |
| | W | 100 | Cu | 1000 | W | 100 | " |
| | W-5%Mo | 1 | Cu-1%Cr | 20 | Ni | 1 | " |
| | W-5%Mo | 10 | Cu-1%Cr | 100 | Ti | 10 | " |
| | W-5%Mo | 100 | Cu-1%Cr | 1000 | Nb | 50 | " |
| | W-5%Ni | 1 | Cu | 20 | Mo | 1 | " |
| | W-5%Ni | 10 | Cu | 100 | W | 10 | " |
| | W-5%Ni | 100 | Cu | 500 | Cr | 50 | " |
| | W-5%Ni | 10 | Cu | 1000 | Co | 10 | " |
| | Ni | 1 | Cu-1%Cr | 20 | W-5%Mo | 1 | " |
| | Ti | 10 | Cu-1%Cr | 100 | W-5%Mo | 10 | " |
| | Nb | 100 | Cu-1%Cr | 1000 | W-5%Mo | 100 | " |
| | Mo | 2 | Cu | 20 | W-5%Ni | 1 | " |
| | W | 5 | Cu | 100 | W-5%Ni | 10 | " |
| | Cr | 5 | Cu | 500 | W-5%Ni | 100 | " |

TABLE 10-continued

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| Comparative example | Co | 5 | Cu | 1000 | W-5%Ni | 10 | " |
| | W | 0.8 | Cu | 30 | W | 0.8 | 1499 |
| | W-5%Mo | 50 | Cu-1%Cr | 500 | W | 150 | 1725 |
| | Co-5%Ni | 5 | Cu | 18 | W | 5 | 1614 |
| | W | 10 | Cu-1%Cr | 2000 | W | 10 | Unweldable |
| | Cu foil (Thickness 70 μm) | | | | | | 782 |
| | Any foils are not used. | | | | | | 496 |

EXAMPLE 11

As shown in Table 11, 17 kinds of samples of insert materials (which are samples prepared by electroplating both surfaces of a sheet-like Cu or Cu alloy core material with Cr or Cr alloy as coated layers, and other samples prepared by electroplating respectively one surface of the Cu or Cu alloy core material with Cr or Cr alloy and the other surface thereof with any one of Ni, Ti, Nb, W, Mo and Co as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and lower electrodes 1 and 2 (radiused electrodes each consisting of Cr—Zr—Cu alloy of 16 mm in diameter, which corresponds to the second group of JIS Z 3234, and having the radiused tip end of 80 mm in R) and the overlapped materials to be welded 11 and 12 (5182-O materials each consisting of Al—Mg alloy and having the thickness of 1 mm) each having the size of 30×200 mm, and the single phase AC welding machine having the structure shown in FIG. 2 was used to carry out the welding up to 12000 times of continuous spot welding on welding conditions of welding current: 25000 A, electrode force: 2950N, weld time: 7 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 11 with other data.

TABLE 11

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| Example of the invention | Cr | 1 | Cu | 20 | Cr | 1 | Not less than 12000 |
| | Cr | 10 | Cu | 100 | Cr | 10 | " |
| | Cr | 100 | Cu | 1000 | Cr | 100 | " |
| | Cr-1%Fe | 1 | Cu-1%Cr | 20 | Ni | 1 | " |
| | Cr-1%Fe | 10 | Cu-1%Cr | 100 | Ti | 10 | " |
| | Cr-1%Fe | 100 | Cu-1%Cr | 1000 | Nb | 50 | " |
| | Cr-1%Ni | 1 | Cu | 20 | Mo | 1 | " |
| | Cr-1%Ni | 10 | Cu | 100 | W | 10 | " |
| | Cr-1%Ni | 100 | Cu | 500 | Cr | 50 | " |
| | Cr-1%Ni | 10 | Cu | 1000 | Co | 10 | " |
| | Ni | 1 | Cu-1%Cr | 20 | Cr-1%Fe | 1 | " |
| | Ti | 10 | Cu-1%Cr | 100 | Cr-1%Fe | 10 | " |
| | Nb | 100 | Cu-1%Cr | 1000 | Cr-1%Fe | 100 | " |
| | Mo | 2 | Cu | 20 | Cr-1%Ni | 1 | " |
| | W | 5 | Cu | 100 | Cr-1%Ni | 10 | " |
| | Cr | 5 | Cu | 500 | Cr-1%Ni | 100 | " |
| | Co | 5 | Cu | 1000 | Cr-1%Ni | 10 | " |
| Comparative example | Cr-1%Fe | 0.8 | Cu | 30 | Cr | 0.8 | 1375 |
| | Cr-1%Fe | 150 | Cu-1%Cr | 500 | Cr | 150 | 1622 |
| | Cr-1%Ni | 5 | Cu | 18 | Cr | 5 | 1491 |
| | Cr-1%Ni | 10 | Cu-1%Cr | 2000 | Cr | 10 | Unweldable |
| | Cu foil (Thickness 70 μm) | | | | | | 718 |
| | Any foils are not used. | | | | | | 521 |

EXAMPLE 12

As shown in table 12, 17 kinds of samples of insert materials (which are samples prepared by electroplating both surfaces of a sheet-like Cu or Cu alloy core material with Co or Co alloy as coated layers and other samples prepared by electroplating respectively one surface of the Cu or Cu alloy core material with Co or Co alloy and the other surface thereof with any one of Ni, Ti, Nb, W, Mo and Cr as the coated layers) were prepared for use in the process of the invention. Further, 5 kinds of samples of insert materials other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and under electrodes 1 and 2 (dome-radiused electrodes each consisting of Cr—Cu alloy of 16 mm in diameter, which corresponds to the second group of JIS Z 3234, and having the dome-radiused tip end) and the overlapped materials to be welded 11 and 12 (5082-O materials each consisting of Al—Mg alloy and having the thickness of 1 mm) each having the size of 30×200 mm, and the single phase AC welding machine having the structure shown in FIG. 6 was used to carry out the welding up to 12000 times of continuous spot welding on welding conditions of welding current: 24500 A, electrode force: 2940N, weld time: 8 cycles and 30 mm pitch: 5 spots.

The additional conditions were similar to those in the case of example 1.

Then, with respect to each case, the peel test for the insert materials was made and the electrode life was evaluated similarly to the case of example 1.

The results thus obtained are shown in Table 12 with other data.

TABLE 12

| | Insert materials | | | | | | |
|---|---|---|---|---|---|---|---|
| | Coated metal on electrode side | | Material | Overall | Coated metal on material side | | |
| Class | Materials | Thickness (μm) | of core material | thickness (μm) | Material | Thickness (μm) | Electrode life (Spot welding times) |
| Example of the invention | Co | 1 | Cu | 20 | Co | 1 | Not less than 12000 |
| | Co | 10 | Cu | 100 | Co | 10 | " |
| | Co | 100 | Cu | 1000 | Co | 100 | " |
| | Co-5%Cr | 1 | Cu-1%Cr | 20 | Ni | 1 | " |
| | Co-5%Cr | 10 | Cu-1%Cr | 100 | Ti | 10 | " |
| | Co-5%Cr | 100 | Cu-1%Cr | 1000 | Nb | 50 | " |
| | Co-5%Mn | 1 | Cu | 20 | Mo | 1 | " |
| | Co-5%Mn | 10 | Cu | 100 | W | 10 | " |
| | Co-5%Mn | 100 | Cu | 500 | Cr | 50 | " |
| | Co-5%Mn | 10 | Cu | 1000 | Co | 10 | " |
| | Ni | 1 | Cu-1%Cr | 20 | Co-5%Cr | 1 | " |
| | Ti | 10 | Cu-1%Cr | 100 | Co-5%Cr | 10 | " |
| | Nb | 100 | Cu-1%Cr | 1000 | Co-5%Cr | 100 | " |
| | Mo | 2 | Cu | 20 | Co-5%Mn | 1 | " |
| | W | 5 | Cu | 100 | Co-5%Mn | 10 | " |
| | Cr | 5 | Cu | 500 | Co-5%Mn | 100 | " |
| | Co | 5 | Cu | 1000 | Co-5%Mn | 10 | " |
| Comparative example | Co-5%Cr | 0.8 | Cu | 30 | Co | 0.8 | 1522 |
| | Co-5%Cr | 150 | Cu-1%Cr | 500 | Co | 150 | 1755 |
| | Co-5%Mn | 5 | Cu | 18 | Co | 5 | 1618 |
| | Co-5%Mn | 10 | Cu-1%Cr | 2000 | Co | 10 | Unweldable |
| | Cu foil (Thickness 70 μm) | | | | | | 811 |
| | Any foils are not used. | | | | | | 564 |

EXAMPLE 13

As shown in Table 13, 4 kinds of samples of insert materials (which are samples prepared by electroplating one surface of a sheet-like core material consisting of Fe and stainless steel with Ni as a coated layer, and other samples consisting of Ni foil and Ti foil) were prepared for use in the process of the invention. Further, 2 kinds of samples of insert materials (Cu and Ag) other than those used for the example of the invention were prepared as comparative examples.

Then, the resistance spot welding was carried out according to the following procedure as to both the cases where the sample of each insert material was used and not used.

The insert materials 9 and 10 each having the size of 30×200 mm were interposed respectively between the upper and lower electrodes 1 and 2 (radiused electrodes each consisting of Cr—Cu alloy of 16 mm in diameter, which corresponds to the second group of JIS Z 3234, and having the radiused tip end of 150 mm in R) and the overlapped materials 11 and 12 (5182-O materials each consisting of Al—Mg alloy and having the thickness of 1 mm) each having the size of 30×200 mm, and the single phase DC resistance welding machine having the structure shown in FIG. 1 was used to carry out the welding up to 12000 times of continuous spot welding on welding conditions of welding current: 22000 A, electrode force: 1960N, weld time: 8 cycles and 30 mm pitch: 5 spots.

The additional conditions were similar to those in the case of example 1.

Then, with respect to each case, the electrode life was evaluated similarly to the case of example 1.

The results thus obtained are shown in Table 13 with other data.

TABLE 13

| | | Insert material | | | | | | |
|---|---|---|---|---|---|---|---|---|
| | | Electrode side | | | Side of material to be welded | | | |
| Class | Form | Material | Thickness (μm) | Melting Point (°C.) | Material | Thickness (μm) | Melting Point (°C.) | Electrode life (Spot welding times) |
| Example of the invention | First layer | Nickel | 50 | 1455 | — | — | — | Not more than 12000 |
| | " | Titanium | 50 | 1800 | — | — | — | " |
| | Second layer | Iron | 25 | 1530 | Titanium | 10 | 1800 | " |
| | " | Stalinless steel | 25 | 1471 | Titanium | 15 | 1800 | " |
| Comparative example | First layer | Pure copper | 50 | 1083 | — | — | — | 550 |
| | " | Silver | 50 | 960 | — | — | — | 630 |
| | Not used | | | | | | | 211 |

As apparent from Tables 2 to 13, Examples 2 to 13 have a tendency to obtain approximately similar results to that of Example 1 (provided that no peel test for the insert materials was made in Examples 2, 7 and 10). Namely, in any example of the resistance welding process according to the invention, the electrode life could attain to not less than 12000 times of spot welding. However, in each comparative example, the electrode life could not reach 1800 times of spot welding.

As has been described above, according to the resistance welding process for aluminum and aluminum alloy materials of the invention, the electrode life can be remarkably improved, and the resistance spot welding can be carried out without damaging the surface of the product.

What is claimed is:

1. A resistance welding process for aluminum and aluminum alloy materials, comprising the steps of:

providing an insert material having an overall thickness of 0.02 to 1 mm and including a sheet-like core material consisting of iron or steel and a coated layer on each surface of said core material, each coated layer having a thickness of 1 to 100 μm and consisting of any one of Ni, Ni alloy, Ti, Ti alloy, Nb, Nb alloy, Mo, Mo alloy, W, W alloy, Cr, Cr alloy, Co and Co alloy;

interposing said insert material between each of upper and lower electrodes and an overlapped portion of materials to be welded consisting of aluminum or aluminum alloy; and pressing said materials to be welded by said upper and lower electrodes to weld said materials together.

2. A resistance welding process for aluminum and aluminum alloy materials according to claim 1, wherein the coated layers on both surfaces of the core material in said insert material consist of the same metal.

3. A resistance welding process for aluminum and aluminum alloy materials according to claim 1, wherein the coated layers on both surfaces of the core material in said insert material consist of metals different from each other.

4. A resistance welding process for aluminum and aluminum alloy materials, comprisign the steps of:

providing an insert material having an overall thickness of 0.02 to 1 mm and including a sheet-like core material consisting of Cu or Cu alloy and a coated layer on each surface of said core material, each coated layer having a thickness of 1 to 100 μm and consisting of any one of Ni, Ni alloy, Ti, Ti alloy, Nb, Nb alloy, Mo, Mo alloy, W, W alloy, Cr, Cr alloy, Co and Co alloy;

interposing said insert material between each of upper and lower electrodes and an overlapped portion of materials to be welded consisting of aluminum or aluminum alloy; and pressing said materials to be welded by the upper and lower electrodes to weld said materials together.

5. A resistance welding process for aluminum and aluminum alloy materials according to claim 4, wherein the coated layers on both surfaces of the core material in said insert material consist of the same metal.

6. A resistance welding process for aluminum and aluminum alloy materials according to claim 4, wherein the coated layers on both surfaces of the core material in said insert material consist of metals different from each other.

7. A resistance welding process for aluminum and aluminum alloy materials, comprising the steps of:

providing an insert material having an overall thickness of 0.02 to 1 mm and including a sheet-like core material consisting of iron or steel and a coated layer having a thickness of 1 to 100 μm, consisting of Ti and formed on one surface of said core material;

interposing said insert material between each of upper and lower electrodes and an overlapped portion of the materials to be welded consisting of aluminum or aluminum alloy in such a state that said coated layer faces the overlapped materials to be welded; and pressing said overlapped materials to be welded by said upper and lower electrodes to weld said materials together.

* * * * *

UNITED STATES PATENT AND TRADEMARK OFFICE
CERTIFICATE OF CORRECTION

PATENT NO. : 5,552,573
DATED : September 3, 1996
INVENTOR(S) : OKITA et al

It is certified that error appears in the above-indentified patent and that said Letters Patent is hereby corrected as shown below:

Col. 1, line 27, after "like" insert --for the--.

Col. 15, under the heading "Materials", line 6, "Cr-1%Fe" should read --Cr-1%Ni--.

Col. 27, line 51, delete "under" insert --lower--.

Col. 30, line 2, delete "comprisign" insert --comprising--.

Signed and Sealed this

Tenth Day of June, 1997

Attest:

BRUCE LEHMAN

Attesting Officer

Commissioner of Patents and Trademarks